United States Patent [19]

Reytblatt

[11] 4,008,960
[45] Feb. 22, 1977

[54] PHOTOELASTIC STRAIN GAUGE COATING AND METHOD OF USING SAME

[76] Inventor: Zinovy V. Reytblatt, 530 W. Aldine Ave., Chicago, Ill. 60657

[22] Filed: Aug. 18, 1975

[21] Appl. No.: 605,720

[52] U.S. Cl. ............................... 356/33; 73/88 A; 356/34; 356/35
[51] Int. Cl.² ........................................ G01B 11/18
[58] Field of Search ............... 356/32, 33, 34, 35; 73/88 A

[56] References Cited

UNITED STATES PATENTS

| | | | |
|---|---|---|---|
| 3,067,606 | 12/1962 | Oppel | 356/34 |
| 3,289,526 | 12/1966 | Tuppeny, Jr. et al. | 356/32 |

FOREIGN PATENTS OR APPLICATIONS

| | | | |
|---|---|---|---|
| 657,486 | 2/1963 | Canada | 356/35 |

Primary Examiner—Vincent P. McGraw
Attorney, Agent, or Firm—Prangley, Dithmar, Vogel, Sandler & Stotland

[57] ABSTRACT

The photoelastic strain gauge coating comprises a sheet of photoelastic material of predetermined shape having a multiplicity of minute discontinuities or sets of discontinuities arranged in a predetermined grid. The predetermined shape and grid, together with boundary devices, provide a standard format to enable use of supporting computer programs. In practicing the method, the coating is bonded to the workpiece surface to be analyzed, and then illuminated by polarized light and photographed. The photograph is then magnified greatly to enable examination seriatim of the patterns at and about each discontinuity or set of discontinuities. The data thus obtained is processed, using the supporting computer programs to obtain a strain field of the portion of the workpiece covered by the coating.

18 Claims, 18 Drawing Figures

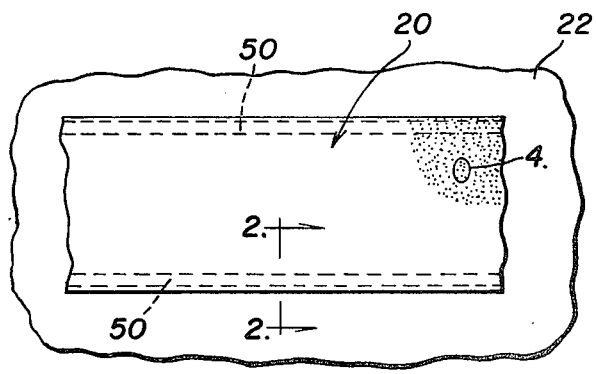
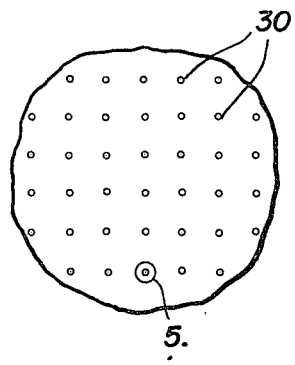
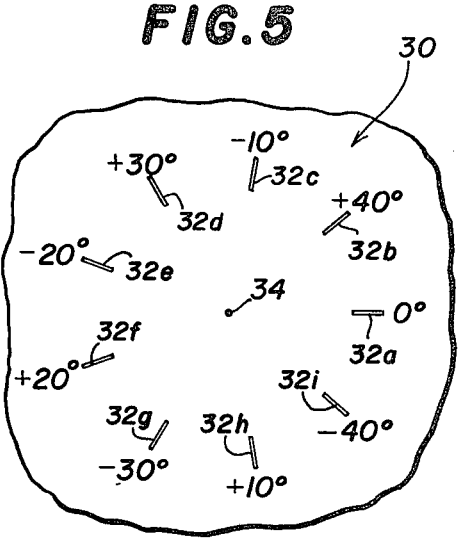
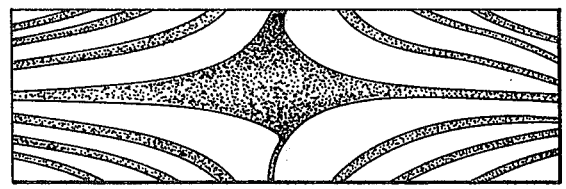
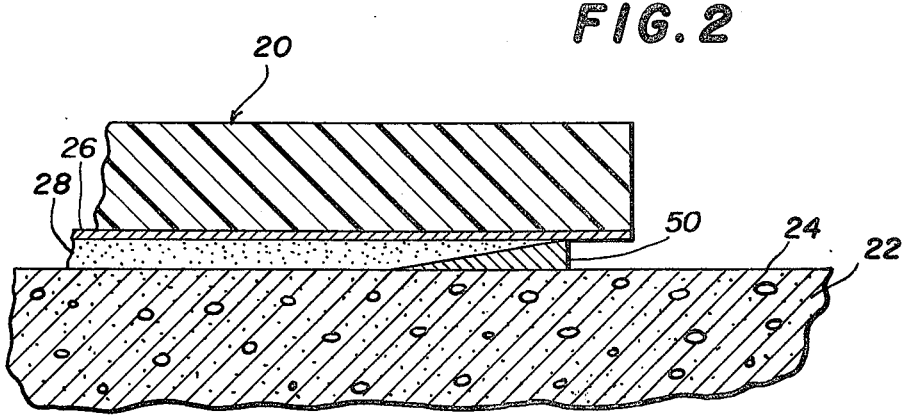

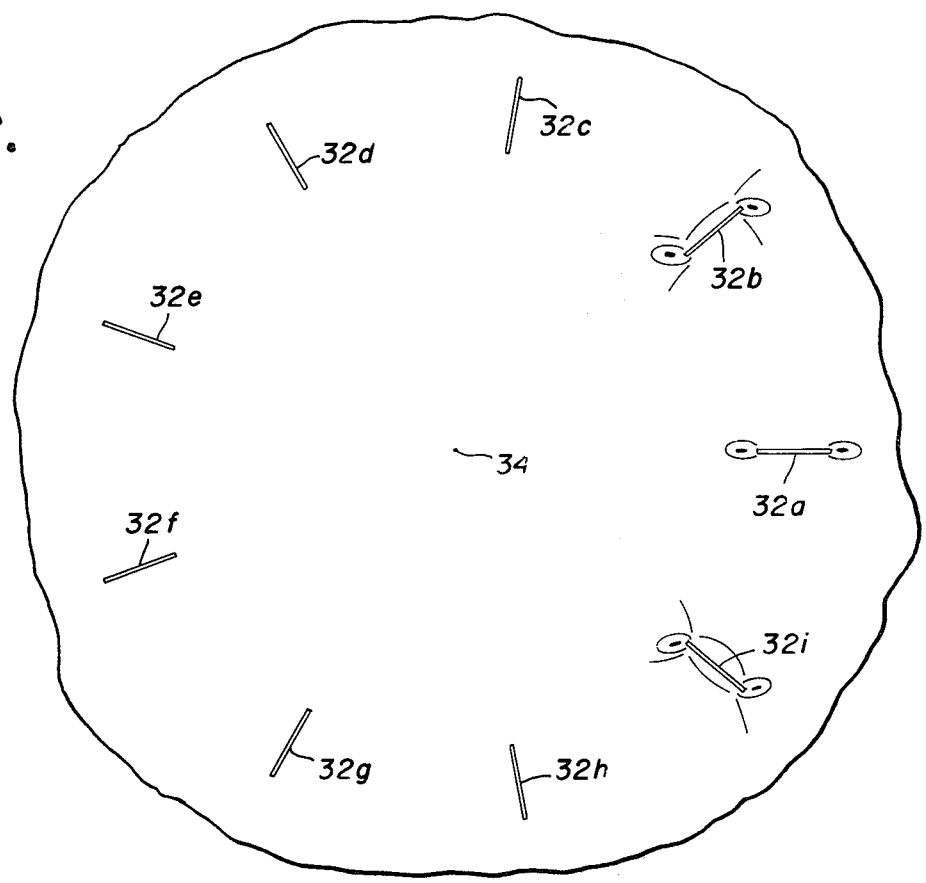
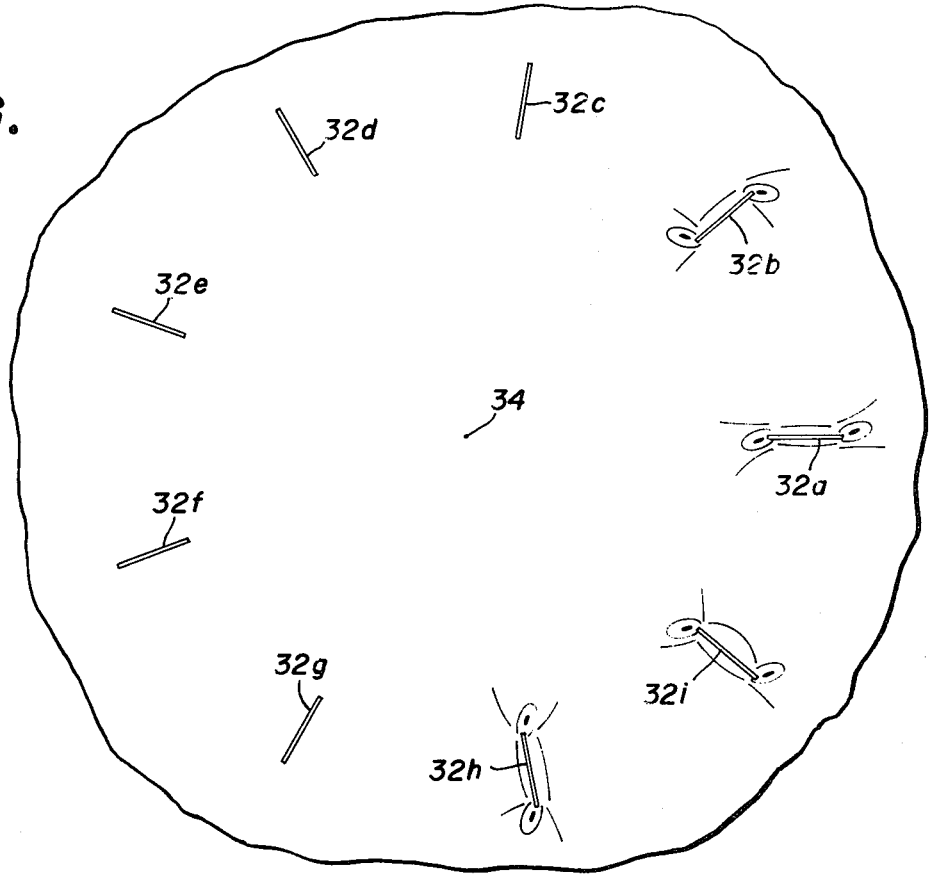

PHOTOELASTIC STRAIN GAUGE COATING AND METHOD OF USING SAME

BACKGROUND OF THE INVENTION

Photoelastic material has the optical properties of polarizing light when under stress and transmitting such light on the principal stress planes. The velocities of the light depend on the strain in the workpiece, which phenomenon is known as "birefringence." The photoelastic material is clear, elastic, and should be homogeneous, optically isotropic when under no stress or strain, and reasonably free from creep, aging, and edge distrubance. Examples of photoelastic material are Bakelite, celluloid, gelatin, synthetic resins, glass, and other such commercial products that are optically sensitive to stress and strain.

When the photoelastic material is subject to monochromatic polarized light, the birefringence of the photoelastic material causes the light to emerge refracted in two orthogonal planes. Because the velocities of light propagation are different in each direction, there occurs a phase shifting of the light waves. When the waves are recombined with polarizing film, regions of stress where the wave phase is canceled appear black, and regions of stress where the wave phase is combined appear light. When white light is used in place of monochromatic light, the relative retardation of the photoelastic material causes the fringes to appear in colors of the spectrum.

In using a photoelastic strain gauge to measure strain in the workpiece, the gauge is bonded to the workpiece surface, and illuminated by polarized light. A photograph is taken of the gauge which depicts patterns that an experienced technician can "read," to determine the difference of the strain in the workpiece along the two principal directions. The principal directions of the strain have, in the past, been determined by noting the orientation of the polarizing device. Additional photographs are taken for additional orientations of the polarizing device, thereby to obtain the principal directions of strain throughout the area of the workpiece covered by the gauge. This procedure is too time consuming and expensive because of the need to change the orientations of the polarizing device and to take multiple photographs.

Also, in the past, a gauge was specially constructed to conform to the shape of the workpiece, in which case the boundary conditions were unpredictable because of unknown forces transmitted to the coating. Because each gauge would have to have a different shape, it was not feasible to utilize computer technology to analyze the results of these photographs.

SUMMARY OF THE INVENTION

It is therefore an important object of the present invention to enable determination of the magnitude and direction of strain in a workpiece with a single photograph (assuming initial birefringence to be zero).

Another object is to provide a photoelastic strain gauge coating which has a standard construction so as to be susceptible to analysis in accordance with a computer program.

In summary, there is provided a photoelastic strain gauge coating adapted to be bonded to a surface of a workpiece, the photoelastic strain gauge coating comprising a sheet of photoelastic material having a multiplicity of minute discontinuities therein, the discontinuities being operative to display patterns representative of the two principal directions of strain and the magnitude of the difference in strain along the two principal directions, in the regions of the workpiece respectively aligned with the discontinuities.

In another aspect of the invention, there is provided a method of measuring the two principal directions of strain and the difference in strain therealong, at a multiplicity of points in a workpiece, the method comprising providing a sheet of photoelastic material having a multiplicity of minute discontinuities, bonding the sheet to the surface of the workpiece, illuminating the sheet with polarized light, magnifying the photograph sufficiently to enable examination of the patterns at and about each of the discontinuities, and assessing the patterns to determine the strain directions and the strain differences at and about each of the discontinuities.

The sheet of photoelastic material has a standardized size and shape, and the discontinuities or sets of discontinuities are arranged in a predetermined or standardized grid which, together with boundary devices for the sheet of photoelastic material, provides a standardized format to enable use of supporting computer programs. These programs process the raw data in the form of principal directions of strain and strain differences along such principal directions to obtain a strain field of the covered portion of the workpiece.

BRIEF DESCRIPTION OF THE DRAWINGS

FIG. 1 is a plan view of a fragmentary portion of a workpiece surface, there being mounted thereon a photoelastic strain gauge coating which incorporates the features of the present invention, the stippling in the upper right-hand corner representing discontinuities extending throughout the coating;

FIG. 2 is a sectional view on an enlarged scale taken along the line 2—2 of FIG. 1;

FIG. 3 depicts an exemplary pattern which may appear on the coating of FIG. 1 when the workpiece is strained and the coating is illuminated by polarized light;

FIG. 4 is a greatly enlarged view of the portion of the coating within the area labeled "4" in FIG. 1;

FIG. 5 is a greatly enlarged view of one of the areas depicted in FIG. 4;

FIG. 6 is an enlarged view of the area depicted in FIG. 5, and schematically depicting part of an exemplary pattern thereon corresponding to a strain having given principal directions;

FIG. 6A is a view like FIG. 6, but with the strain being in other principal directions;

DESCRIPTION OF THE PREFERRED EMBODIMENTS

Figure 7:
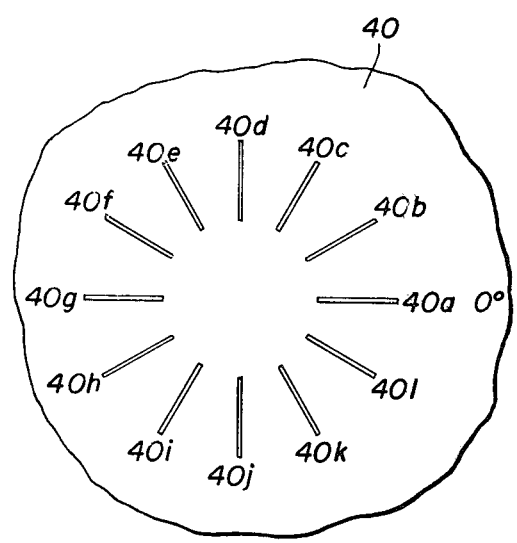
FIG. 7 is a view like FIG. 5, but depicting a second embodiment of the present invention.

Turning now to FIGS. 1 and 2, a photoelastic strain gauge coating 20 is bonded to a workpiece 22 for yielding information on the strain therein. "Stress" and "strain" are sometimes used interchangeably in this application, since one can be determined if the other is known and a stress-strain diagram is available. A sheet of reflective material 26 is bonded to the underside of the coating 20. Although the coating 20 may have any desired shape, the shape of FIG. 1 is a strip, that is to say, it is much longer than it is wide. The coating 20 is bonded to the surface 24 of the workpiece 22 by cement 28 or by other suitable means. Instead of the reflective sheet 26, reflective plating may be deposited on the underside of the coating 20.

When the coating 20 is illuminated by polarized light, its birefringent characteristics cause the velocities of light rays passing through it to be dependent upon the stresses in the workpiece 22. Thus, the light reflected from the sheet 26 produces visual patterns in the coating 20, which may take the form shown in FIG. 3.

There is provided in the surface of the coating 20 a multiplicity of areas 30 that are arranged in a predetermined grid. When the coating is a strip, it is preferred that the grid be rectangular, as shown in FIG. 4. Valid readings will be obtained in such case, as long as the length of the strip is many times greater than its width, for example, 8:1 or more. If the area of the coating 20 were, for example, 100 square inches, there may be from several hundred to several thousand areas 30. FIG. 5 depicts the details of each such area. In this form, there is provided a set of nine radially directed notches 32a to 32i, each notch surrounding a centrally located node 34. The depth of each notch in the form illustrated is less than the thickness of the coating 20.

Adjacent to the outer end of each notch 32a to 32i is a notation representing a principal stress direction. The angles determining one of the two principal strain directions need only be specified within a 180° range (e.g., ±90°), since, for example, it is implicit that a principal strain direction at +40° means the strain is directed along a line at +40° and +220°. The second of the two principal strain directions is perpendicular to the first. Thus, if it were determined that one principal strain direction was at 40° (actually +40°, +220°), then the second principal strain direction would be at +130° (actually +130°, +310°). For simplicity, only one of the two angles defining a principal direction will be specified hereinafter. Therefore, it is only necessary to specify the angle over a 90° range (e.g., ±45°). Each notation in FIG. 5 corresponds to the displacement of the associated notch from 0°, 90°, 180°, or 270°, whichever is closer. Thus, the notch 32c is located at +80°, which is −10° with respect to the 90° point. The notch 32f is located at 200° (5 times 40°), which is +20° with respect to the 180° point; hence, a marking of "+20°." The notch 32j is at a location of +320° (8 times 40°), which is −40° with respect to the 0° point; hence, the notation "−40°." Each notation defines the two principal directions of a given strain. Each area may be as small as a few thousandths of one square inch or less, so that the angular notations would probably not be etched into the coating 20. Instead, an instruction sheet, template, or the like may identify the angles of each notch.

When illuminated by polarized light, the areas 30 and the notches 32a to 32j therein will not be visible because they are so minute, but rather there will appear the pattern shown in FIG. 3. However, the photograph may then be magnified by microfiche techniques, so that a selected area 30 may be viewed. The polarized light causes the patterns to be focused about discontinuities, such as the notches 32a to 32i and the node 34. The patterns produced in the region of the node 34 represent the magnitude of the strain difference in the corresponding region of the workpiece 22. "Strain difference" means the difference in the strain along one principal direction and the strain in the other principal direction. The patterns are monochromatic or colored as previously described. A technician skilled in the art of reading these patterns can determine the magnitude of the strain difference from such pattern.

Other patterns focus about the notches 32a to 32i. They will be symmetrical about the notch corresponding to one of the principal directions of strain. Thus, if a pattern is symmetrical about the notch 32g, then it is known that one principal direction of strain is at −30°, and the other principal direction is at +60°. If, on the other hand, the pattern is not exactly symmetrical about any of the notches, then the technician searches for the pair of notches about which the patterns are most symmetrical. For example, suppose the patterns are most symmetrical about the notches 32b and 32d. If they are equally symmetrical about each of those notches, then the technician knows that one direction of principal strain is between +30° and +40°, that is, +35°, and the other principal direction is +125°. If it is a little more symmetrical about the notch 32d, then the technician knows that the principal direction must be between +30° and +35°. Thus, the tolerance of the embodiment of FIG. 5 is 5°; that is, a technician may analyze a principal strain direction within 5° or less.

FIG. 6 depicts the patterns appearing about some of the notches when the principal direction of strain is 0°. It will be noted that patterns are only drawn about the notches 32a, 32b, and 32i. This is done to simplify FIG. 6, but it is to be understood that patterns will generally appear about the notches 32c to 32h also. The technician viewing the area 30 shown in FIG. 6 will look for the pattern which is symmetrical, that being the pattern about the notch 32a. That being the case, the technician knows that the principal direction of strain in that particular area is 0°. There will also appear patterns about the node 34 which represent the magnitude of the strain difference, but which, for purposes of simplicity, are not shown.

In the area 30 depicted in FIG. 6A, only patterns are shown about the notches 32a, 32b, 32h, and 32i, again it being understood that patterns will appear about the notches 32c to 32g also, but, for the sake of simplicity, such patterns are not shown. It will be noted that none of the four patterns depicted in FIG. 6A is symmetrical. However, the patterns about the notches 32a and 32h are the most symmetrical, it being assumed that the patterns appearing about the other notches 32c to 32g are no more symmetrical. The technician then knows that the principal direction of strain in the area depicted in FIG. 6A is between 0° (the notch 32a) and +10° (the notch 32h). The amount of symmetry appears to be substantially the same about the two notches, and therefore the technician would note a principal direction of +5°. If the symmetry about the notch 32a were slightly greater, then the technician might note a direction of +4° or +3°.

By magnifying the areas 30 seriatim and noting as to each such area the magnitude and principal directions of strain, a strain field about the portion of the workpiece 22 covered by the coating 20 may be obtained.

The principal strain sum (E) may be determined by knowing the angle defining the principal directions and the principal strain difference (g) according to the following formula:

$$E = \frac{2}{1+v} \int_s g \frac{\delta G}{\delta n} ds + \int_\Omega g [\cos 2aK_1^{(h)} + \sin 2aK_2^{(h)}] d\Omega$$

$$- \frac{\Omega_n}{8\pi} \left[ \frac{\delta^2 g}{\delta s_1^2} - \frac{\delta^2 g}{\delta s_2^2} \right]$$

wherein "v" is Poisson's ratio; "G" is Green's function; "n" is a normal at the boundary of the coating 20; "a" is the angle between the abscissa and a principal strain direction; "$K_1^{(h)}$" and "$K_2^{(h)}$" are limited kernels depending on G; "$\Omega_n$" is a small region around the node 34 under consideration; "$s_1$" and "$s_2$" are the principal directions of strain; "S" is the boundary of the coating 20; and "$\Omega$" is the domain of the coating 20.

A computer program may be generated in accordance with a coating 20 of a given shape, size, grid configuration of the areas 30 and known boundary conditions (which will be discussed hereinafter). The technician who is examining the areas 30 seriatim notes the principal strain difference and the direction of principal strain for each such area, which the computer will process to generate a plot of the magnitude and direction of strain at each of the nodes 34.

If greater sensitivity than that achieved with the form of FIGS. 1 to 6 is desired, then thirteen notches may be provided, in which case the sensitivity would be increased to 3.5°, or seventeen notches, in which case the sensitivity would be further increased to 2.6°.

In FIG. 7, there is shown an alternative embodiment, in which each area is marked with the reference numeral 40. There are provided twelve notches 40(a) to 40(l), separated by 30° intervals. Patterns in this embodiment will focus around four notches. If a principal strain direction is 0°, patterns will focus around the notches 40a, 40d, 40g, and 40j. This particular embodiment has a sensitivity or tolerance of about 15°, that is, midway between any two notches.

Figure 8:
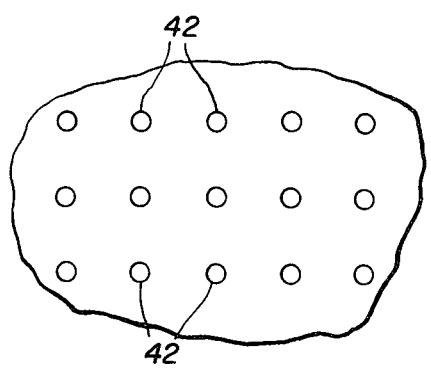
FIG. 8 is a fragmentary view like FIG. 4, but depicting still another embodiment of the present invention.
Figure 9:
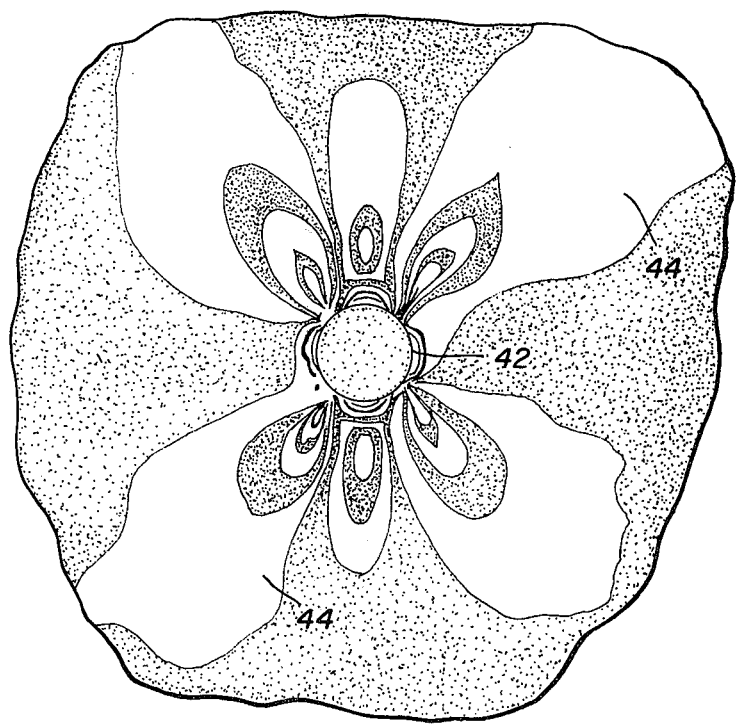
FIG. 9 is an enlarged view of one of the areas depicted in FIG. 8, and the resultant pattern from a strain having given principal directions.

An alternative shape of the discontinuity in each area is a round hole. Referring to FIG. 8, the coating 20 has a grid of holes 42. A pattern focuses about each hole 42, as shown in FIG. 9. A skilled technician can "read" the pattern and determine the magnitude of strain difference in the corresponding portion of the workpiece. The direction of symmetry of the pattern represents the principal strain directions, in this case, about 0° and 90°. As in the previous embodiments, the photograph is amplified in order to present the pattern shown in FIG. 9. The pattern surrounding each hole 42 is examined seriatim to obtain a strain plot.

In order that the previously discussed formula yield accurate results, there must be no sharp changes in the strain that are transferred from the workpiece 22 to the coating 20. If the coating 20 were to be applied directly to the workpiece 22, then sharp changes in the coating 20 would occur near its boundaries and/or the boundaries of the workpiece 22. To prevent such changes, or at least minimize them, there is provided a pair of elongated members 50, each being wedge-shaped in cross section.

Figure 10:
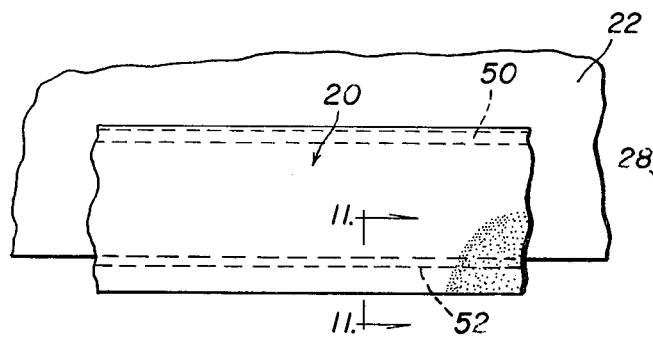
FIG. 10 is a plan view like FIG. 1, but with the coating bonded adjacent to a boundary of the workpiece.
Figure 11:
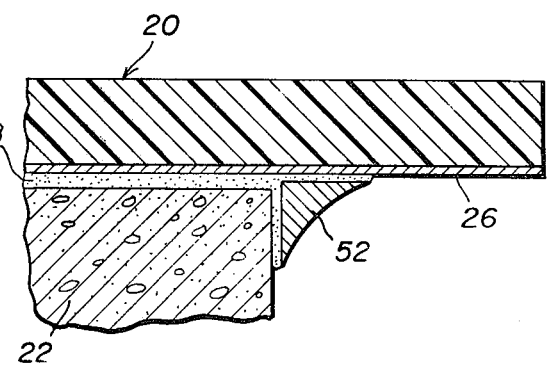
FIG. 11 is a sectional view on an enlarged scale, taken along the line 11—11 of FIG. 10.

The members 50 dampen the strain which would have been directly coupled from the workpiece 22 to the coating 20 to cause high concentrations of strain to appear near the boundary of the coating 20. However, whith the wedge-shaped members 40 in place, such high concentrations of strain are eliminated or at least substantially reduced.

Where the coating 20 is to be applied to a region which encompasses a boundary of the workpiece 22, such as is shown in FIG. 10, it is preferable to use at such boundary a different shaped member. Such member is identified by the reference numeral 52 and has a cove-molding shape. This member 52 has the same effect as the member 50, except it enables more accurate readings to appear closer to the region of the boundary of the workpiece 22. The member 52 is secured by cement 28 to the workpiece 22 and to the coating 20.

Because the coating 20 in the form of FIGS. 1–11 is a strip, no members 50 are needed at the ends. The members 50 assure predictable boundary conditions, so that the previously discussed formula is valid.

Figure 12:
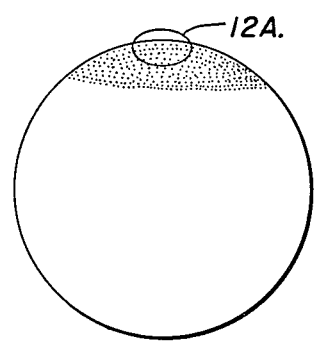
FIGS. 12 to 16 are plan views of coatings of different shapes, the stippling representing discontinuities extending throughout each coating.
Figure 12A:
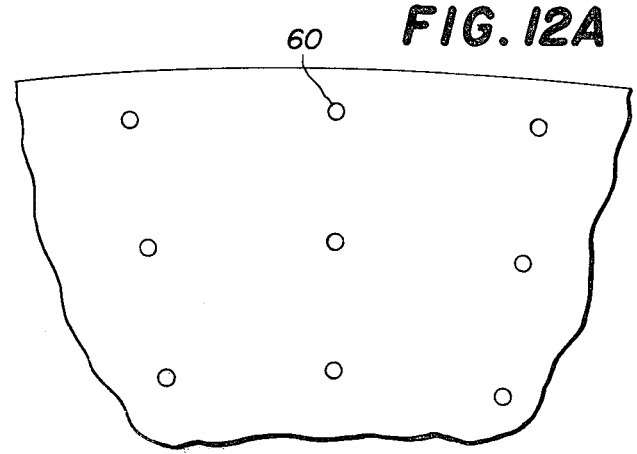
Figure 13:
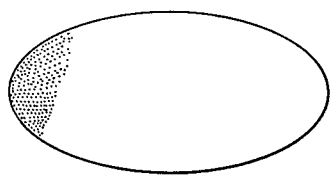
Figure 14:
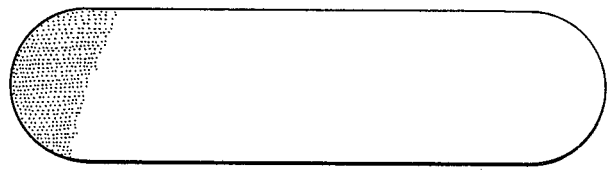
Figure 15:
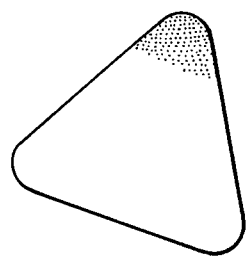
Figure 16:
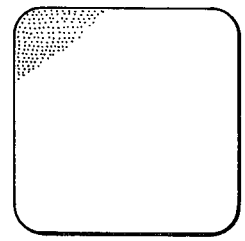

An alternate shape of the coating may be circular, as shown in FIG. 12. The preferred grid format is shown in FIG. 12A, each area of a discontinuity or discontinuities being labeled with the reference numeral "60." Other shapes are shown in FIGS. 13–16. The shape depicted in FIG. 13 is substantially elliptical. The oblong shape of FIG. 14 is actually epitrochoidal. FIG. 15 depicts a hypotrochoidal curvilinear triangle, and FIG. 16 depicts a hypotrochoidal curvilinear square.

Whichever of the shapes is used, the formula previously discussed would take same into account. However, one of the important objects of this invention is to enable the coating to be standardized, so that the same computer program (based on the formula) may be used. Thus, one of the shapes and corresponding grid configuration are selected. The other shapes may be used with suitable change in the formula parameters.

What has been described, therefore, is an improved photoelastic strain gauge coating which can be used to obtain the strain field in a workpiece with a minimum of time and expense. The coating is standardized, so that a computer may be suitably programmed to make the necessary calculations to generate the strain field.

I claim:

1. A photoelastic strain gauge coating adapted to be bonded to a surface of a workpiece, comprising a sheet of photoelastic material having a multiplicity of minute discontinuity means therein, each of said discontinuity means being operative to display patterns representative of the principal directions of strain and the magnitude of the difference in strain along such directions in the region of the workpiece respectively aligned with each of said discontinuity means, and means for reducing sharp changes of the strain in said sheet of photoelastic material in the region of the boundaries of said photoelastic material and the workpiece.

2. The photoelastic strain gauge coating of claim 1, wherein said sheet of photoelastic material is a strip.

3. The photoelastic strain gauge coating of claim 1, wherein said sheet of photoelastic material is substantially round.

4. The photoelastic strain gauge coating of claim 1, wherein said sheet of photoelastic material has the shape of a hypotrochoidal curvilinear triangle.

5. The photoelastic strain gauge coating of claim 1, wherein said sheet of photoelastic material is substantially elliptical.

6. The photoelastic strain gauge coating of claim 1, wherein said sheet of photoelastic material has the shape of a hypotrochoidal curvilinear rectangle.

7. The photoelastic strain gauge coating of claim 1, wherein said minute discontinuity means are uniformly distributed in a grid.

8. The photoelastic strain gauge coating of claim 1, wherein each of said discontinuity means is a hole extending through said material.

9. The photoelastic strain gauge coating of claim 1, wherein each of said discontinuity means is a hole extending part way through said sheet of photoelastic material.

10. A photoelastic strain gauge coating adapted to be bonded to a surface of a workpiece, comprising a sheet of photoelastic material having a multiplicity of minute areas, each of said areas including a plurality of radially directed notches, said notches being operative to display patterns representative of the principal directions of strain and the magnitude of the difference in strain along such directions in the regions of the workpiece respectively aligned with each of said areas.

11. The photoelastic strain gauge coating of claim 10, wherein the depth of each of said notches is less than the thickness of said sheet of photoelastic material.

12. The photoelastic strain gauge coating of claim 10, wherein each of said areas includes 12 notches at 30° intervals.

13. The photoelastic strain gauge coating of claim 10, wherein each of said areas includes nine notches at 40° intervals.

14. A photoelastic strain gauge coating adapted to be bonded to a surface of a workpiece, comprising a sheet of photoelastic material having a multiplicity of minute areas, each of said areas including a plurality of radially directed notches, said notches being operative to display patterns representative of the principal directions of strain and the magnitude of the difference in strain along such directions in the regions of the workpiece respectively aligned with said notches, and means for reducing sharp changes of the strain in said sheet of photoelastic material in the region of the boundaries of said photoelastic material and the workpiece.

15. The photoelastic strain gauge coating of claim 14, wherein said reducing means is a member having a shape matching the associated portion of the boundary of the sheet and is wedge-shaped in cross section, said member being adapted to be bonded between the associated portion of the boundary of said sheet and the workpiece surface.

16. The photoelastic strain gauge coating of claim 15, wherein said sheet is a strip and said member is elongated.

17. The photoelastic strain gauge coating of claim 14, wherein said reducing means is a member having a shape matching the associated portion of the boundary of the workpiece and being triangularly shaped in cross section, said member being adapted to be bonded to the associated portion of the boundary of the workpiece and to the underside of said sheet of photoelastic material.

18. The photoelastic strain gauge coating of claim 17, wherein said coating is a strip and said member is elongated.

* * * * *